(12) United States Patent
Lin et al.

(10) Patent No.: US 12,105,365 B1
(45) Date of Patent: Oct. 1, 2024

(54) LIGHT REFLECTING DEVICE AND SWITCHING METHOD THEREOF

(71) Applicant: NATIONAL SUN YAT-SEN UNIVERSITY, Kaohsiung (TW)

(72) Inventors: Tsung-Hsien Lin, Kaohsiung (TW); Cheng-Chang Li, Kaohsiung (TW); Li-Min Chang, Kaohsiung (TW); Duan-Yi Guo, Kaohsiung (TW); Kuan-Wu Lin, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 18/442,126

(22) Filed: Feb. 15, 2024

(30) Foreign Application Priority Data

Dec. 28, 2023 (TW) ................................ 112151358

(51) Int. Cl.
*G02F 1/133* (2006.01)
*G02F 1/1337* (2006.01)
*G02F 1/137* (2006.01)

(52) U.S. Cl.
CPC .... *G02F 1/13306* (2013.01); *G02F 1/133738* (2021.01); *G02F 1/13718* (2013.01); *G02F 2203/02* (2013.01)

(58) Field of Classification Search
CPC .................................................. G02F 1/13718
See application file for complete search history.

(56) References Cited

U.S. PATENT DOCUMENTS

| 9,046,730 B2 * | 6/2015 | Li | G02F 1/13718 |
| 2005/0068621 A1 * | 3/2005 | Umeya | G03B 21/604 |
| | | | 359/459 |
| 2019/0331956 A1 * | 10/2019 | Lin | C09K 19/36 |

FOREIGN PATENT DOCUMENTS

CN 102707473 A * 10/2012 ......... G02F 1/13718

* cited by examiner

*Primary Examiner* — Alexander P Gross
(74) *Attorney, Agent, or Firm* — WPAT, PC

(57) ABSTRACT

A light reflecting device includes two substrates and a liquid crystal layer. The two substrates are parallel to each other and respectively electrically connected to a voltage source to generate an electric field therebetween. Each of the two substrates has an inner surface having a horizontal orientation. The liquid crystal layer is formed by liquid crystal materials filled between the two substrates. The liquid crystal materials include liquid crystal molecules and ions of salt species. The liquid crystal molecules are at least formed by negative liquid crystals and chiral molecules. The liquid crystal layer is respectively switched to a diffuse reflection state and a specular reflection state by applying the electrical field generated by the voltage source in a first frequency and a second frequency. The second frequency is higher than the first frequency.

5 Claims, 4 Drawing Sheets

LIGHT REFLECTING DEVICE AND SWITCHING METHOD THEREOF

CROSS REFERENCE TO RELATED APPLICATION

The application claims the benefit of Taiwan application serial No. 112151358, filed on Dec. 28, 2023, and the entire contents of which are incorporated herein by reference.

BACKGROUND OF THE INVENTION

1. Field of the Invention

The present invention relates to an optical component and an adjusting technique for the optical characteristics thereof and, more particularly, to a light reflecting device having switchable states between a specular reflection state and diffuse reflection state and a switching method thereof.

2. Description of the Related Art

The reflection of lights follow the reflection rule that the reflected angle equals to the incident angle. If a reflection surface is a smooth surface, a specular reflection occurs, and a virtual image, as a mirror image of a concrete object, is generated in the reflection surface. If a reflection surface is irregular, a diffuse reflection occurs, and incident lights is reflected in various directions with the same brightness to show the appearance and the color of the reflection surface. Moreover, by utilizing the phenomenon of the diffuse reflection, a projection surface can be made to show a complete image from projecting lights.

According to the above-mentioned smooth surface or irregular surface, the reflection characteristics of the conventional light reflecting device are limited to its reflection surface that is limited to one of the specular reflection and diffuse reflection based on micro-structures (such as crystal boundaries, arrangements among molecules, etc.) of its material. Consequently, the conventional light reflecting device cannot be optionally switched between the functions of mirror and projection surface. Moreover, even some conventional smart glasses (made by glass materials) can be switched into transparent state, shielding (non-transparent) state, vague (semi-transparent) state and reflecting state by active control means such as applying extra electrical power, irradiating specific lights, etc., those convention smart glasses are still limited to materials thereof and can simply provide only one type of the specular reflection and the diffuse reflection in the reflection state. That is, the convention smart glass still cannot be switched between the specular reflection and the diffuse reflection in its reflection state.

In light of the above, it is necessary to improve the conventional light reflection device.

SUMMARY OF THE INVENTION

To solve the above problems, it is an objective of the present invention to provide a light reflecting device capable of switching between the specular reflection state and the diffuse reflection state.

It is another objective of the present invention to provide a light reflecting device capable of maintaining the desired reflection state without consuming extra energy.

It is yet another objective of the present invention to provide a switching method of the light reflecting device capable of easily and rapidly switching between the specular reflection state and the diffuse reflection state.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "ions of salt species" means the ions belonging to "salt compound" or "ionic compound" in chemistry which is different from the acid species and alkali species.

A light reflecting device according to the present invention includes two substrates and a liquid crystal layer. The two substrates are parallel to each other. The two substrates are respectively electrically connected to a voltage source to generate an electric field therebetween. The two substrates each has an inner surface having a horizontal orientation. The liquid crystal layer formed by liquid crystal materials filled between the two substrates. The liquid crystal materials include liquid crystal molecules and ions of salt species. The liquid crystal molecules are at least formed by negative liquid crystals and chiral molecules. The liquid crystal layer is respectively switched to a diffuse reflection state and a specular reflection state by the applying the electrical field generated by the voltage source in a first frequency and a second frequency. The second frequency is higher than the first frequency.

A switching method of the reflecting device according to the present invention includes the following steps. In a stable state that the light reflecting device is in the specular reflection state where the liquid crystal molecules are parallelly aligned with the two substrates, the electrical field with the first frequency is applied to act on the liquid crystal layer, so that the ions of salt species are vibrated to disarrange the liquid crystal molecules to switch the light reflecting device into the diffuse reflection state; and the electrical field is removed. After removing the electrical field, the light reflecting device is maintained in the diffuse reflection state. In a stable state that the light reflecting device is in the diffuse reflection state where the liquid crystal molecules are inclinedly aligned with the two substrates, the electrical field with the second frequency is applied to act on the liquid crystal layer, so that the ions of salt species are inhibited from vibration, and the liquid crystal molecules are parallelly aligned with the two substrates to switch the light reflecting device into the specular reflection state; and the electrical field is removed. After removing the electrical field, the light reflecting device is maintained in the specular reflection state.

Therefore, in the light reflecting device and the switching method thereof, by switching the frequency magnitude of the applied voltage, the arrangement of the liquid crystal molecules can be changed so as to achieve the specular reflection effect where the liquid crystal molecules are parallelly aligned with the two substrates, and achieve the diffuse reflection effect where the liquid crystal molecules are chaotically/disorderly arranged (inclinedly aligned with the two substrates). Further, by the liquid crystal materials having bi-stable states, after the light reflecting device being switched into the specular reflection state acting as a mirror or the diffuse reflection state acting as a projection surface, the corresponding switched state can be maintained without continuously applying a corresponding voltage so as to achieve the effects of saving energy and facilitating operation.

In an example, the voltage source provides a voltage ranging from 30 V to 60 V, and a frequency of the electric field ranges from 60 Hz to 5000 Hz. Therefore, within the ranges of the voltage and frequency, corresponding electrical parameters (the voltage, the first frequency and the second frequency) can be selected to switch the light reflecting devices with various specifications, thereby achieving the effect of rapidly and optionally switching between the specular reflection state and the diffuse reflection state.

In an example, the first frequency of the electric field is 60 Hz, and the second frequency of the electric field is 5000 Hz. Therefore, the first frequency (low frequency) can effectively activate the vibration of the liquid crystal materials to disturb/disarrange the arrangement of the liquid crystal molecules, and the second frequency (high frequency) can effectively inhibit/suppress the vibration of the liquid crystal materials to align the liquid crystal molecules in a desired order arrangement, thereby improving the stability and reliability on operating the light reflecting device.

In an example, the liquid crystal layer is configured to reflect a light within a visible light spectrum ranging from 400 nm to 700 nm. Therefore, the light reflecting device can act as the mirror to visibly reflect mirror images, or act as the projection surface to visibly reflect projected images.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
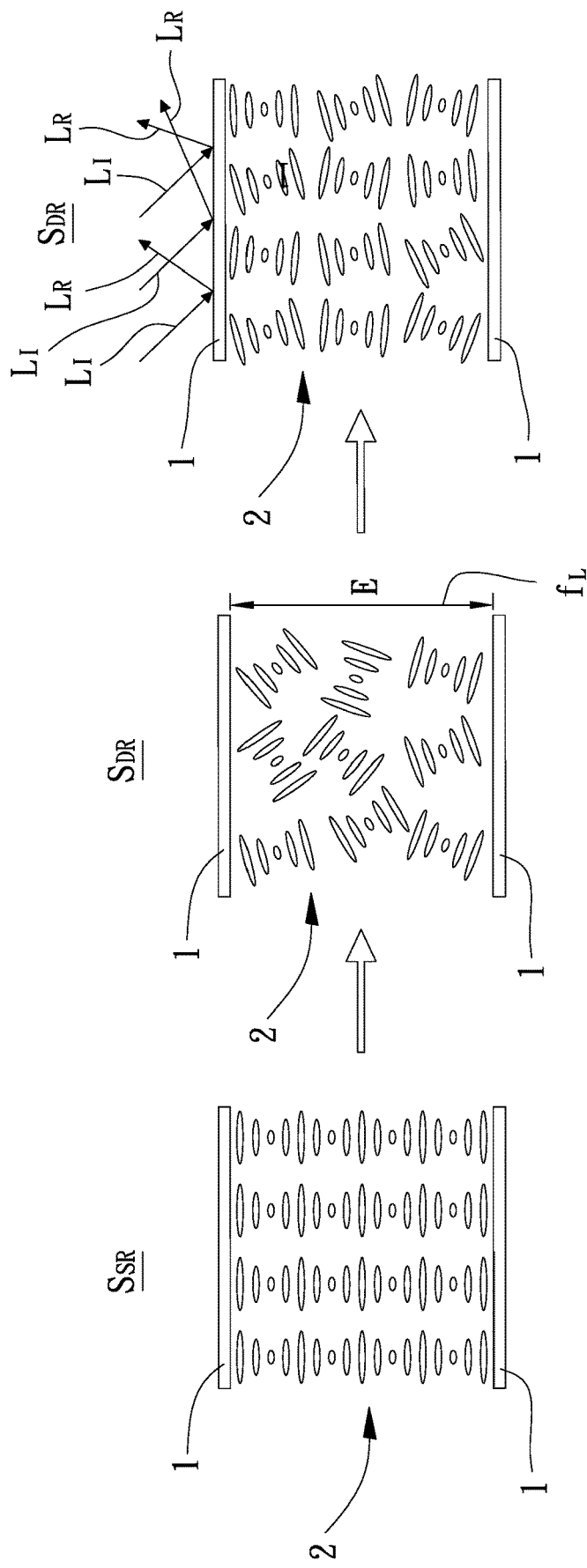
FIG. 1 is a schematic drawing showing a switching process and variations of arrangements of liquid crystal molecules from a specular reflection state to a diffuse reflection state of a light reflecting device in a preferred embodiment of the invention.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

FIG. 1 shows a light reflecting device of a preferred embodiment according to the present invention. The light reflecting device includes two substrates 1 and a liquid crystal layer 2. The liquid crystal layer 2 is located between the two substrates 1. The two substrates 1 are respectively electrically connected to a voltage source (not shown).

The two substrates 1 are spaced apart to form a receiving space, and the two substrates 1 are preferably arranged in parallel. The two substrates 1 may be made by a transparent composite material, so that lights can pass through the two substrates 1. Said composite material of each of the two substrates 1 may include a hermetic material, such as glass, acrylic, plastic or the like, used to confine the fluid substance between the two substrates 1. Each of the two substrates 1 may include conductive materials, preferably transparent conductive materials, such as Indium Tin Oxide (ITO), nano silver wire, nano metal particle, transparent conductive metal or the like. The two substrates 1 are respectively electrically connected to the voltage source by the conductive materials. The voltage source is configured to provide a voltage, especially an alternating voltage, to generate an electrical field E between the two substrates 1. A frequency of the electrical field E ranges from 60 Hz to 5000 Hz. Each of the two substrates 1 may further include an alignment film. The alignment film may be formed by Polyimide (PI). The two alignment films are respectively arranged on two opposite inner surfaces of the two substrates, and the alignment orientations of the two alignment films are parallel to each other. The alignment orientation of the alignment film may be orientated by rubbing process/alignment to arrange the alignment orientation of the molecules on the surface of the alignment film in a horizontal orientation. Alternatively, in this invention, the orientation technique such as the photo alignment achieved by a contactless way is also adapted for orientating the alignment orientation of the alignment film.

The liquid crystal layer 2 is formed by filling liquid crystal materials within the receiving space between the two substrates 1. In this embodiment, the liquid crystal materials include liquid crystal molecules and ions of salt species. The liquid crystal molecules include negative liquid crystals and chiral molecules. Specifically, the negative liquid crystals are nematic liquid crystals with a dielectric anisotropic less than zero ($\Delta\varepsilon<0$), so that the alignment orientation of the molecules of the liquid crystal materials is perpendicular to the applied electric field. In other words, the liquid crystal molecules of the liquid crystal materials have negative dielectric anisotropic. Further, by adding the chiral molecules to form the liquid crystal materials into cholesteric liquid crystals to have bi-stable states, the liquid crystal layer 2 can be switched into two stable liquid crystal structures as a first arrangement (Well-aligned Structure) and a second arrangement (None-well-aligned Structure). In the first arrangement, all the liquid crystal molecules with a helical arrangement are parallelly aligned with a reference plane (as the plane orientation of the substrate 1). In the second arrangement, the liquid crystal molecules form multiple domains with varied incline angles, and the multiple domains, each having helical arranged liquid crystal molecules, are inclinedly aligned (not parallelly aligned) with the reference plane.

The ions of salt species may be obtained from various ionic compounds. For example, the ions of salt species can be derived from the ionic compound including at least one of NaCl, $CaSO_4$, $Na_2CO_3$, $NaHCO_3$, $KNO_3$, tetrabutylammonium bromide (TBAB), tetrabutylammonium hydrogensulfate (TBAHS), tetrabutylammonium chloride (TBACl), tetrabutylammonium hexafluorophosphate (TBAHFP), tetrabutylammonium tetrafluoroborate (TBATFB).

When lights emit to the light reflecting device, the lights pass through one substrate 1 into the liquid crystal layer 2, and the lights would be reflected by a part of the liquid crystal molecules of the liquid crystal materials to generate multiple reflections. In a condition that the incident angle of the lights are the same and the liquid crystal molecules are configured in the first arrangement, the reflected angles of the lights are the same to generate specular reflection, thereby forming the light reflecting device to have a specular reflection state $S_{SR}$. For example, referring to FIG. 2, in the specular reflection state $S_{SR}$, incident lights $L_I$ with an identical incident angle are reflected to be reflected lights $L_R$ with an identical reflected angle. In another condition that the incident angle of the lights are the same and the liquid crystal molecules are configured in the second arrangement, since the incline angles of the multiple domains are varied, the reflected angles of the lights are varied to generate diffuse reflection, thereby forming the light reflecting device to having a diffuse/matte reflection state $S_{DR}$. For example, referring to FIG. 1, in the diffuse reflection state $S_{DR}$, incident lights $L_I$ with an identical incident angle are reflected to be reflected lights $L_R$ with varied reflected angles. The liquid crystal layer 2 may be adapted for reflecting lights within a visible light spectrum ranging from 400 nm to 700 nm.

The arrangement orientation of the liquid crystal molecules in the liquid crystal layer 2 is induced/affected by the electric field E generated between the two substrates 1, and the arrangement orientation of the liquid crystal molecules is also limited/affected by interaction forces among the alignment orientations of the inner surfaces of the two substrates 1 and the liquid crystal molecules. Specifically, in a condition that the electric field E is applied to the liquid crystal layer 2 with a first/low frequency $f_L$, the ions of salt species of the liquid crystal materials are vibrated to disarrange/disturb an arrangement of the liquid crystal molecules into a chaos arrangement. In another condition that electric field E is applied to the liquid crystal layer 2 with a second/high frequency $f_H$, the ions of salt species are inhibited from vibration, so that the arrangement orientation of the liquid crystal molecules are affected by their negative dielectric anisotropic to have an inclination to arrange perpendicularly to the direction of the electric field E, and concurrently the arrangement orientation of the liquid crystal molecules are affected by the horizontal orientations of the two substrates 1 to be forced to align horizontally with the alignment orientation of the two substrates 1. The second frequency $f_H$ is higher/larger than the first frequency $f_L$. In this embodiment, a voltage of 60 V is applied to the liquid crystal layer 2 with a thickness of 12 mm, so that an electric field strength of the electric field E is 5 V/mm. The second frequency $f_H$ of the electric field E may be 5000 Hz, and the first frequency $f_L$ may be 60 Hz. Nevertheless, the electrical parameters of the electric field E are preferably adjusted according to the specifications and actual usage of the light reflecting device, and the present invention is not limited to said specific values of voltage and frequency. In said specific condition, by the bi-stable characteristics of the liquid crystal materials of the liquid crystal layer 2, the arrangement orientation of the liquid crystal molecules can be maintained/stabilized at zero electrical field between to the two substrates 1 (at zero voltage or without consuming any electrical power). That is, in the condition that an applied electric field E (such as one of the first and second frequencies $f_L$, $f_H$) is turned off or removed, the arrangement orientation of the liquid crystal molecules within the liquid crystal layer 2 is maintained without being changed until a new electric field E (such as the other one of the first and second frequencies $f_L$, $f_H$, or a different electric field E) is applied to the liquid crystal layer 2 to affect the arrangement orientation of the liquid crystal molecules.

Figure 2:
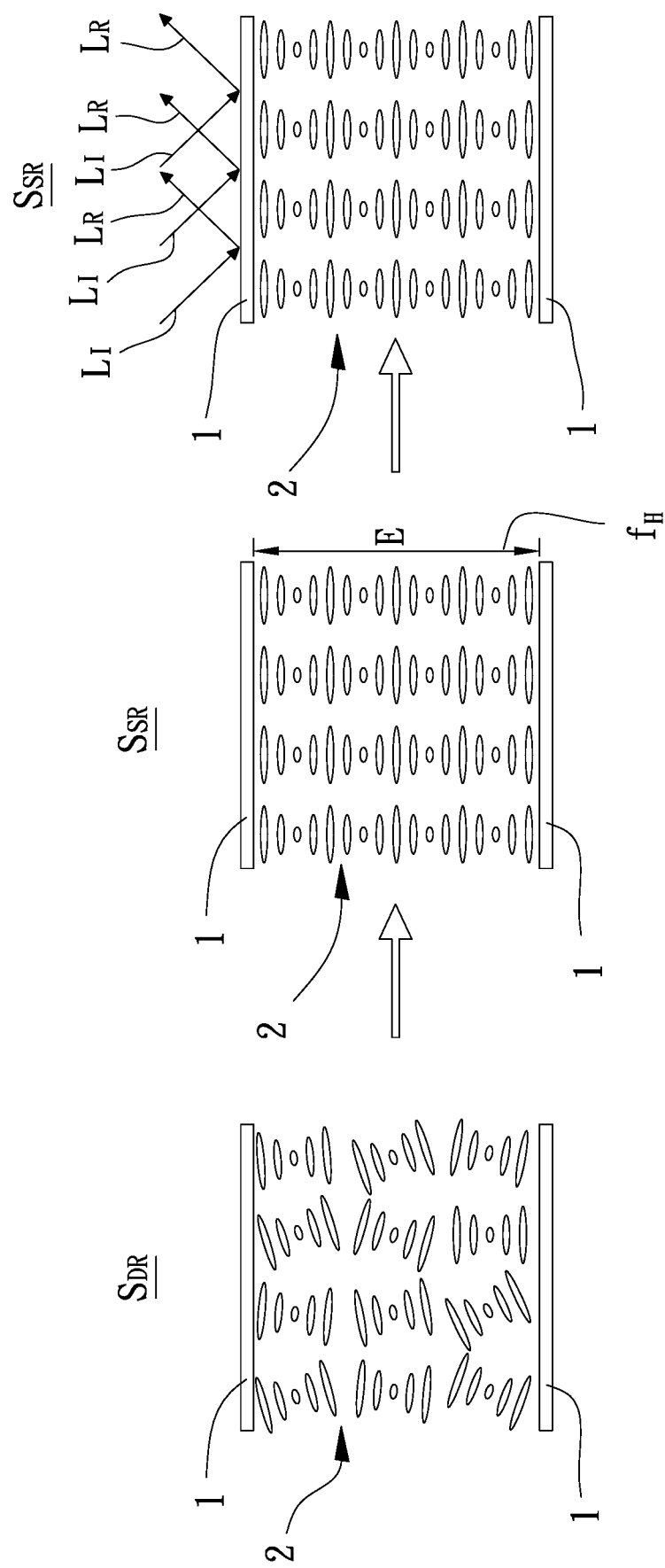
FIG. 2 is a schematic drawing showing a switching process and variations of arrangements of liquid crystal molecules from the diffuse reflection state to the specular reflection state of the light reflecting device in the preferred embodiment of the invention.

Referring to FIGS. 1 and 2 illustrating the switching method of the light reflecting device according to the preferred embodiment of the present invention, the light reflecting device can be switched between the specular reflection state $S_{SR}$ and the diffuse reflection state $S_{DR}$. As shown in FIG. 1, the light reflecting device is initially in the specular reflection state $S_{SR}$ corresponding to a steady structure of the liquid crystal layer 2 where the liquid crystal molecules are arranged in the first arrangement. Consequently, the electric field E with the first frequency $f_L$ applied to the two substrates 1 works on the liquid crystal layer 2, so that the arrangement orientation of the liquid crystal molecules, disarranged by the ions of salt species, is switched into the diffuse reflection state $S_{DR}$. Then, the electric field E with the first frequency $f_L$ is removed, and the diffuse reflection state $S_{DR}$ is maintained after removing said electric field E.

As shown in FIG. 2, the light reflecting device is initially in the diffuse reflection state $S_{DR}$ corresponding to a steady structure of the liquid crystal layer 2 where the liquid crystal molecules are arranged in the second arrangement. Consequently, the electric field E with the second frequency $f_H$ applied to the two substrates 1 works on the liquid crystal layer 2, so that the vibrations of the ions of salt species are inhibited, and the arrangement orientation of the liquid crystal molecules, rearranging to the first arrangement, is switched into the specular reflection state $S_{SR}$. Then, the electric field E with the first frequency $f_H$ is removed, and the specular reflection state $S_{SR}$ is maintained after removing said electric field E.

Figure 3:
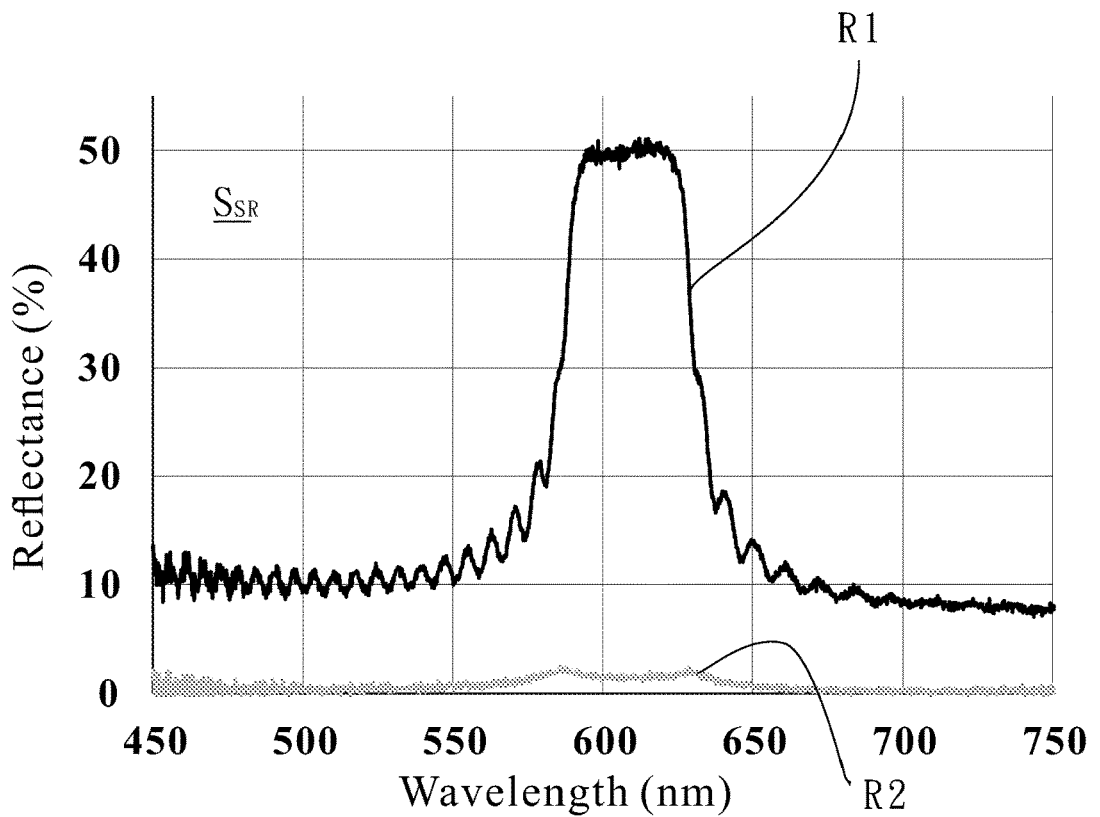
FIG. 3 is a reflectance spectra diagram respectively showing SCI and SCE reflectance curves in the specular reflection state of the light reflecting device according to the preferred embodiment of the invention.
Figure 4:
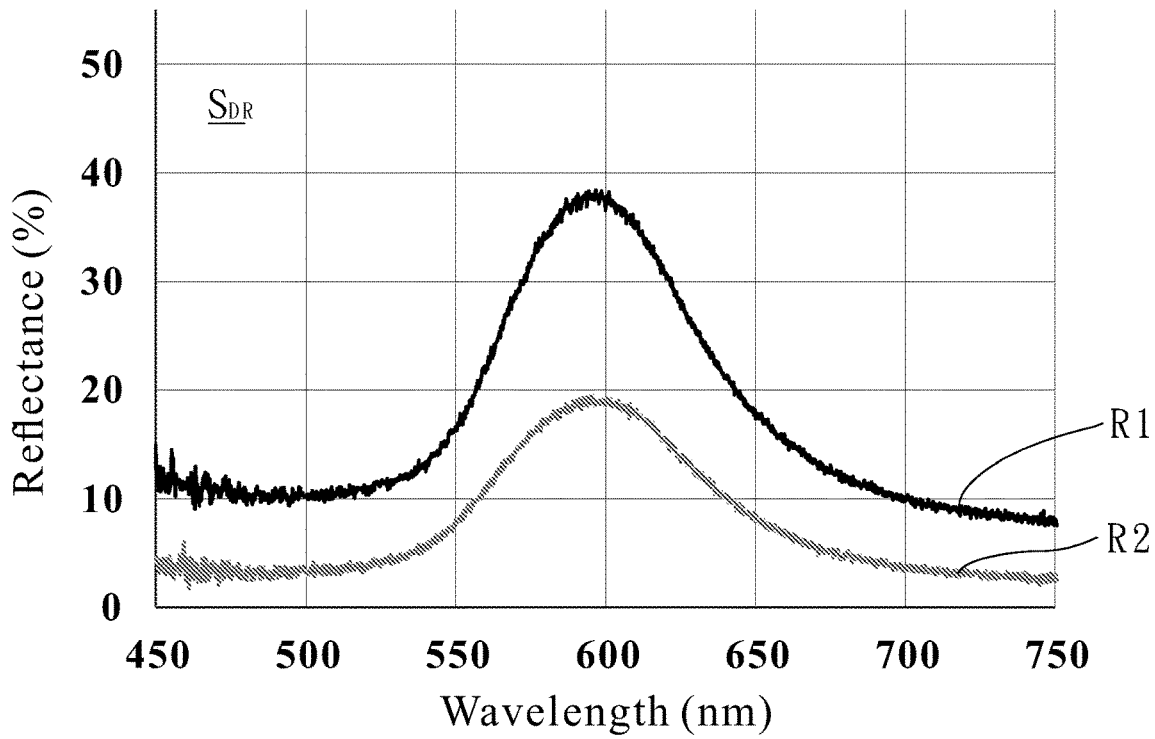
FIG. 4 is a reflectance spectra diagram respectively showing SCI and SCE reflectance curves in the diffuse reflection state of the light reflecting device according to the preferred embodiment of the invention.

FIGS. 3 and 4 respectively illustrate the reflectance spectra of the light reflecting device in the specular reflection state $S_{SR}$ and the diffuse reflection state $S_{DR}$, according to the preferred embodiment of the present invention. The light reflectance curve R1 is measured in a SCI (Specular Component Included) measurement mode to show a relationship between the light reflectance and different light wavelengths. The non-specular reflectance curve R2 is measured in a SCE (Specular Component Excluded) measurement mode to show a relationship between the non-specular reflectance and different light wavelengths. In other words, the light reflectance curve R1 represents the variations of light intensity including the specular reflection and the diffuse/matte reflection, and the non-specular reflectance curve R2 represents the variations of light intensity solely including the diffuse reflection. In FIG. 3, in the specular reflection state $S_{SR}$, the non-specular reflectance curve R2 shows that the diffuse reflectances (non-specular reflectances) of different light wavelengths approach zero, and even the highest values of the diffuse reflectances (approximately appearing within the visible light wavelengths ranging from 550 nm to 650 nm) are less than 5%; while the light reflectance curve R1 reaches a peak reflectance of 50% within the range of the visible light wavelengths. Therefore, in the condition that the light reflecting device is in or switched into the specular reflection state $S_{SR}$, the light reflecting device can act as a mirror to reflect a mirror image from the incident light. In FIG. 4, in the diffuse reflection state $S_{DR}$, although the light reflectance curve R1 reaches a peak reflectance about 40% within the range of the visible light wavelengths, the diffuse reflectances (which peak reflectance about 20%) contribute approximately a half of the light reflectances of the light reflectance curve R1 by observing the distribution of the non-specular reflectance curve R2. Therefore, in the condition that the light reflecting device is in or switched into the diffuse reflection state $S_{DR}$, the light reflecting device is configured to be the diffuse reflection surface and can be used as a projection surface/screen.

Figure 5:
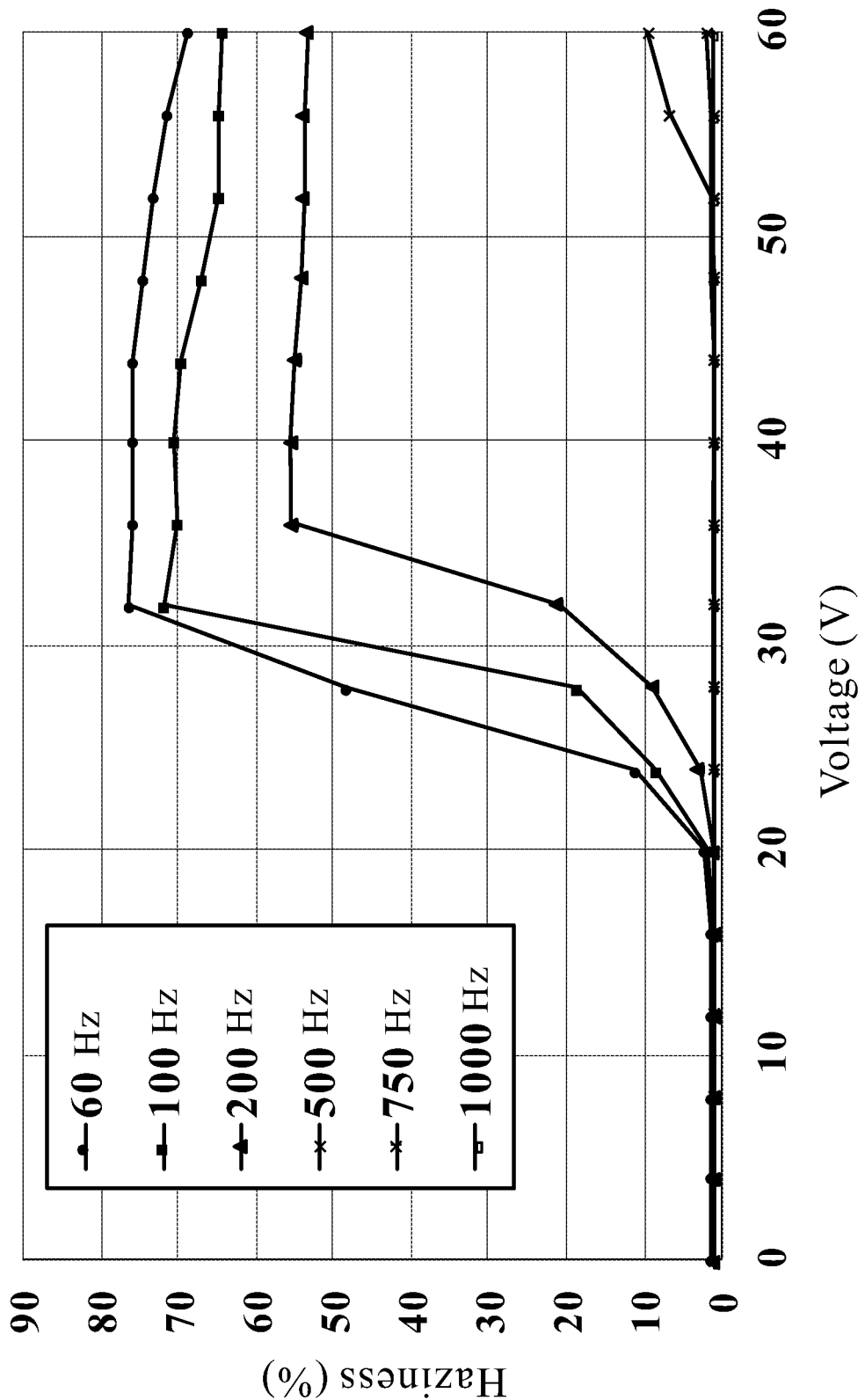
FIG. 5 is a diagram showing relationships among voltages, frequencies and haze degrees in the preferred embodiment of the invention.

FIG. 5 shows multiple curves, demonstrated under different voltage frequencies, each showing a relationship between haze values and voltages in the light reflecting device according to the preferred embodiment of the present invention. In a condition that the applied voltage is less than 20 V, the haze value cannot be further increased regardless of the frequency. Therefore, the voltage equal to or less than 20 V is not adapted for light reflection switching method for this embodiment. In a condition that the applied voltage is 30 V, those voltages with frequencies below 100 Hz can make their haze values reaching over 40%, while those voltages with frequencies above 500 Hz cannot substantially increase their haze values to switch the light reflecting device into the diffuse reflection state $S_{DR}$. Therefore, an applicable electrical condition of the light reflection switching method can be executed by applying the voltage of 30 V, using the frequency equal to or less than 100 Hz to be the first frequency $f_L$, and using the frequency equal to or greater less than 500 Hz to be the second frequency $f_H$. In a condition that the applied voltage is 60 V, those voltages with frequencies below 200 Hz can make their haze values reaching over 50%, and voltages with frequencies 500 Hz and 750 Hz can also initially increase haze values to generate diffuse reflection effect to the light reflecting device. To ensure stable and effective switch between the diffuse reflection and the specular reflection, the first frequency $f_L$ is applied at 60 Hz (or below 60 Hz) to generate the diffuse reflection state $S_{DR}$, and the second frequency $f_H$ is applied at not less than 1000 Hz, preferably at 5000 Hz, to generate the specular reflection state $S_{SR}$. Therefore, an applicable electrical condition of the light reflection switching method can be executed by applying the voltage of 60 V, using the frequency equal to or less than 60 Hz to be the first frequency $f_L$, and using the frequency equal to or greater than 5000 Hz to be the second frequency $f_H$. It should be noted that the experimental result of FIG. 5, obtained through a specific range from various negative liquid crystals, chiral molecules, ions of salt species and other conditions (such as the distance between the two substrates 1), contributes significantly to show the phenomena and tendencies among the applied voltage, frequency and haze value to switch the light reflecting device between the diffuse reflection state $S_{DR}$ and the specular reflection state $S_{SR}$. However, this invention is not limited to the stated specific values of said voltage and frequency. In other words, for light reflecting devices within the claimed limitations performed by other specifications, the corresponding relationships among the electrical parameters (such as the frequencies) of applied voltages and the haze values can be simply measured and established to become reproducible results for switching a corresponding one light reflecting device between the diffuse reflection state $S_{DR}$ and the specular reflection state $S_{SR}$. Similarly, the present invention is not limited to said ions of salt species as long as other ions can also vibrate to disarrange the liquid crystal molecules into the second arrangement (corresponding to the diffuse reflection state $S_{DR}$) by applying the voltage with the first frequency $f_L$, and can also be inhibited from vibration such that the liquid crystal molecules are arranged in the first arrangement (corresponding to the specular reflection state $S_{SR}$) by applying the voltage with the second frequency $f_H$.

In summary, in the light reflecting device and the switching method thereof according to the present invention, by switching the applied voltage between a lower frequency (the first frequency) and a higher frequency (the second frequency) to change the arrangement of the liquid crystal molecules. By applying the specific higher frequency, the liquid crystal molecules are arranged in said well-aligned structure (the first arrangement, all parallelly aligned with the substrate) to generate specular reflection. By applying the specific lower frequency, the liquid crystal molecules are arranged in said none-well-aligned structure (the second arrangement, all inclinedly aligned with the substrate) to generate diffuse reflection. Further, by the liquid crystal materials having bi-stable states, after the light reflecting device being switched into the specular reflection state acting as a mirror or the diffuse reflection state acting as a projection surface, the corresponding switched state can be maintained without continuously applying a corresponding voltage so as to achieve the effects of saving energy and facilitating operation.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims.

What is claimed is:

1. A light reflecting device, comprising:
   two substrates parallel to each other, wherein the two substrates are respectively electrically connected to a voltage source to generate an electric field therebetween, and wherein the two substrates each has an inner surface having a horizontal orientation; and
   a liquid crystal layer formed by liquid crystal materials filled between the two substrates, wherein the liquid crystal materials include liquid crystal molecules and ions of salt species, wherein the liquid crystal molecules are at least formed by negative liquid crystals and chiral molecules, wherein the liquid crystal layer is respectively switched to a diffuse reflection state and a specular reflection state by applying the electrical field generated by the voltage source in a first frequency and a second frequency, wherein the second frequency is higher than the first frequency.

2. The light reflecting device as claimed in claim 1, wherein the voltage source provides a voltage ranging from 30 V to 60 V, and wherein a frequency of the electric field ranges from 60 Hz to 5000 Hz.

3. The light reflecting device as claimed in claim 1, wherein the first frequency of the electric field is 60 Hz, and wherein the second frequency of the electric field is 5000 Hz.

4. The light reflecting device as claimed in claim 1, wherein the liquid crystal layer is configured to reflect a light within a visible light spectrum ranging from 400 nm to 700 nm.

5. A switching method applying to a light reflecting device of claim 1, comprising:
   in a stable state that the light reflecting device is in the specular reflection state where the liquid crystal molecules are parallelly aligned with the two substrates,
   applying the electrical field with the first frequency to act on the liquid crystal layer, so that the ions of salt species are vibrated to disarrange the liquid crystal molecules to switch the light reflecting device into the diffuse reflection state; and removing the electrical field;

wherein after removing the electrical field, the light reflecting device is maintained in the diffuse reflection state; and in a stable state that the light reflecting device is in the diffuse reflection state where the liquid crystal molecules are inclinedly aligned with the two substrates, applying the electrical field with the second frequency to act on the liquid crystal layer, so that the ions of salt species are inhibited from vibration, and the liquid crystal molecules are inclinedly aligned with the two substrates to switch the light reflecting device into the specular reflection state; and removing the electrical field;

wherein after removing the electrical field, the light reflecting device is maintained in the specular reflection state.

* * * * *